No. 680,118.  
Patented Aug. 6, 1901.
J. E. BRALEY & W. R. O'NEILL.
NUT LOCK.
(Application filed May 20, 1901.)
(No Model.)
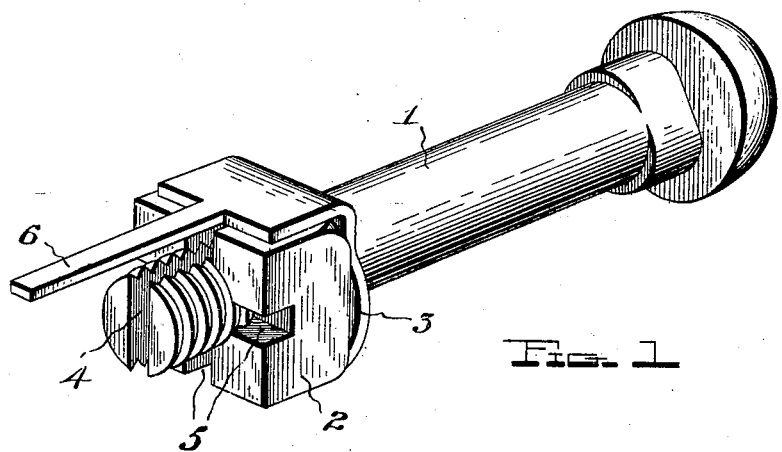
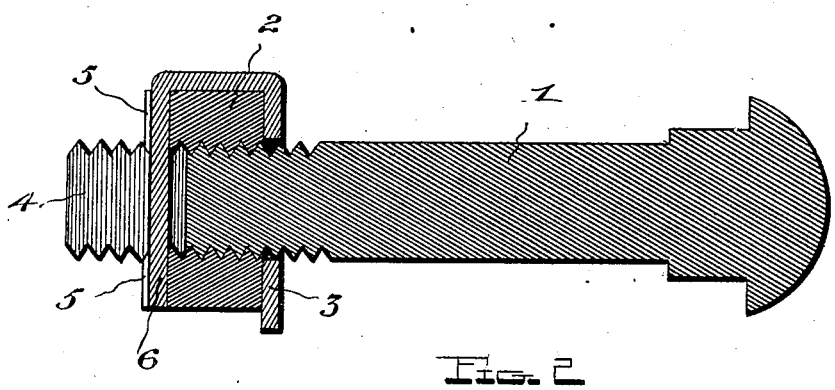

UNITED STATES PATENT OFFICE.

JAMES E. BRALEY AND WILLIAM R. O'NEILL, OF MINERAL, OHIO.

NUT-LOCK.

SPECIFICATION forming part of Letters Patent No. 680,118, dated August 6, 1901.

Application filed May 20, 1901. Serial No. 61,085. (No model.)

*To all whom it may concern:*

Be it known that we, JAMES E. BRALEY and WILLIAM R. O'NEILL, citizens of the United States, residing at Mineral, in the county of Athens and State of Ohio, have invented certain new and useful Improvements in Nut-Locks; and we do declare the following to be a full, clear, and exact description of the invention, such as will enable others skilled in the art to which it appertains to make and use the same.

The invention relates to nut-locks.

The object of the invention is to provide a device of this character which shall be simple of construction, durable in use, comparatively inexpensive of production, and efficient in action.

With this and other objects in view the invention consists of certain novel features of construction, combination, and arrangement of parts, which will be hereinafter more fully described, and particularly pointed out in the appended claim.

In the accompanying drawings, Figure 1 is a perspective view of the bolt, illustrating our improved form of nut and washer in place thereon, the tongue of the washer being shown in a horizontal position—that is, in the position it assumes before being engaged with the slot in the bolt; and Fig. 2 is a transverse sectional view through the end of the bolt, nut, and washer, the tongue of the washer being shown seated in the slot of the bolt and the groove of the nut.

In the drawings, 1 denotes a bolt, 2 a nut, and 3 a washer. The bolt is provided at its threaded end with a slot 4 and the nut in its top with radially-intersected grooves 5. The washer is provided with a horizontally-extended base to engage the side of the nut and with a laterally-projecting tongue 6 to engage one of the grooves of the nut and the slot of the bolt. When in the position shown in Fig. 1, it being assumed that the nut has been screwed home the desired distance, the tongue is bent into the registering grooves and slot of the nut and bolt, respectively, in which position it will be impossible to unscrew the nut. When it is desired to remove the nut, the tongue may be forced from its position in the groove and slot and the nut and washer be turned off the bolt.

From the foregoing description, taken in connection with the accompanying drawings, the construction, mode of operation, and advantages of our invention will be readily understood without requiring a more extended explanation.

Various changes in the form, proportion, and details of construction may be made within the scope of the invention without departing from the spirit or sacrificing any of the advantages thereof.

Having thus described our invention, what we claim, and desire to secure by Letters Patent, is—

The combination with a bolt provided with a slot in its threaded end, of a nut provided with radiating grooves in its top, and a washer having a laterally-extending lip to engage one of the sides of said nut, and a ductile tongue to lie in the alining groove and slot of the nut and bolt, respectively, substantially as set forth.

In testimony whereof we have hereunto set our hands in presence of two subscribing witnesses.

JAMES E. BRALEY.
WILLIAM R. O'NEILL.

Witnesses:
HOYT S. KING,
REBECCA WILSON.